US011294776B2

United States Patent
Kvache et al.

(10) Patent No.: US 11,294,776 B2
(45) Date of Patent: Apr. 5, 2022

(54) SYSTEMS AND METHODS FOR REMOTE-INITIATED DEVICE BACKUP

(71) Applicant: Verizon Patent and Licensing Inc., Arlington, VA (US)

(72) Inventors: Alexander Kvache, Brookline, MA (US); Nikunj Marvania, Harrison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 72 days.

(21) Appl. No.: 16/827,956

(22) Filed: Mar. 24, 2020

(65) Prior Publication Data
US 2021/0303411 A1  Sep. 30, 2021

(51) Int. Cl.
*G06F 11/14* (2006.01)
*H04L 9/32* (2006.01)

(52) U.S. Cl.
CPC ...... *G06F 11/1464* (2013.01); *G06F 11/1451* (2013.01); *G06F 11/1456* (2013.01); *G06F 11/1461* (2013.01); *H04L 9/3213* (2013.01)

(58) Field of Classification Search
CPC ............. G06F 11/1464; G06F 11/1461; G06F 11/1451; G06F 11/1456
See application file for complete search history.

(56) References Cited

U.S. PATENT DOCUMENTS

| 7,467,267 | B1* | 12/2008 | Mayock | G06F 11/1464 711/162 |
| 8,121,982 | B1* | 2/2012 | Panchbudhe | H04W 28/14 707/652 |
| 8,285,850 | B1* | 10/2012 | Jones | H04L 47/20 709/227 |
| 2009/0276475 | A1* | 11/2009 | Ramsey | H04W 12/033 |
| 2010/0115092 | A1* | 5/2010 | Westin | H04L 67/02 709/224 |
| 2011/0047033 | A1* | 2/2011 | Mahaffey | H04L 41/0253 705/14.66 |
| 2011/0047341 | A1* | 2/2011 | Yu | G06F 11/1464 711/162 |
| 2012/0210126 | A1* | 8/2012 | Johnson | G06F 16/00 713/165 |
| 2014/0244315 | A1* | 8/2014 | Cahill | G06Q 40/08 705/4 |

(Continued)

OTHER PUBLICATIONS

Apple Inc., "Notifications" (available at https://developer.apple.com/notifications/, visited Mar. 24, 2020).

(Continued)

*Primary Examiner* — Kamini B Patel

(57) ABSTRACT

A system described herein may provide a technique for the remote backup of a User Equipment ("UE"). An initiating device may be registered as being associated with the UE, and may initiate remote backups of the UE, without requiring user interaction at the UE. Different network backup policies may be specified in the request, such as a "Wi-Fi only" network backup request. If the UE is in a "lost" mode, a "damaged" mode, and/or is otherwise unusable or inaccessible, the specified network backup policy may be overridden, to ensure that the UE is backed up and the relevant device data may be recovered.

20 Claims, 10 Drawing Sheets

(56) References Cited

U.S. PATENT DOCUMENTS

| | | | |
|---|---|---|---|
| 2014/0245014 A1* | 8/2014 | Tuck | H04W 12/086 |
| | | | 713/171 |
| 2015/0227601 A1* | 8/2015 | Ram | G06F 11/1453 |
| | | | 707/645 |
| 2015/0244798 A1* | 8/2015 | Bolotin | H04L 67/1095 |
| | | | 709/217 |
| 2016/0066189 A1* | 3/2016 | Mahaffey | H04W 4/029 |
| | | | 455/405 |
| 2017/0201924 A1* | 7/2017 | Bos | H04W 24/08 |
| 2021/0303411 A1* | 9/2021 | Kvache | G06F 11/1461 |

OTHER PUBLICATIONS

Google Inc., "Firebase Cloud Messaging" (available at https://firebase.google.com/docs/cloud-messaging/, visited Mar. 24, 2020).
Amazon Inc., "Amazon Simple Notification Service" (available at https://aws.amazon.com/sns/, visited Mar. 24, 2020).

* cited by examiner

401

Select what to backup from your device:

Data Type

| | |
|---|---|
| Contacts | ☑ |
| Photos | ☑ |
| Videos | ☑ |
| Music | ☑ |
| Documents | ☐ |
| Messages | ☑ |
| Call History | ☑ |

Select how to backup your device:

| | |
|---|---|
| Wi-Fi Only | ☐ |
| Wi-Fi Only (Specific networks) | ☐ |
| Wi-Fi and Mobile Networks (Data charges may apply) | ☑ |

*Unrestricted backups in Lost mode* ☑

FIG. 4

SYSTEMS AND METHODS FOR REMOTE-INITIATED DEVICE BACKUP

BACKGROUND

User equipment ("UE"), such as mobile telephones, tablet computers, or other devices, may be configured with data, customizations, user preferences, etc. For example, such data, customizations, etc. may include contact information, call history information, pictures, videos, music, installed applications ("apps"), and/or other information.

BRIEF DESCRIPTION OF THE DRAWINGS

FIG. 4 illustrates an example graphical user interface ("GUI") via which backup parameters may be specified, in accordance with embodiments described herein;

DETAILED DESCRIPTION OF THE PREFERRED EMBODIMENTS

The following detailed description refers to the accompanying drawings. The same reference numbers in different drawings may identify the same or similar elements.

UEs, such as mobile telephones, tablets, and/or other devices, may store user information, such as contacts, pictures, videos, messages, call histories, preferences, and/or other information. However, UEs may become lost, stolen, damaged, and/or otherwise inoperable by the user. A backup may be utilized to restore user information when a UE becomes inoperable, lost, damaged, and/or stolen.

Embodiments described herein provide for the remote initiation of a backup of a UE, without requiring an action to be performed by the UE to be backed up. This remote backup may be useful, for example, in situations where a customer is looking to upgrade to a different UE, the original UE has been lost, damaged, or stolen, or is otherwise inaccessible to a user associated with the UE (e.g., a rightful owner of the UE). Further, the remote backup, in accordance with some embodiments, may be useful if a user associated with the UE to be backed up (referred to herein as a "Backup UE") is not technically savvy, is handicapped, and/or is otherwise unable to initiate the backup, but a user associated with another UE (referred to herein as an "Initiating UE") is able to initiate the backup.

Figure 1:
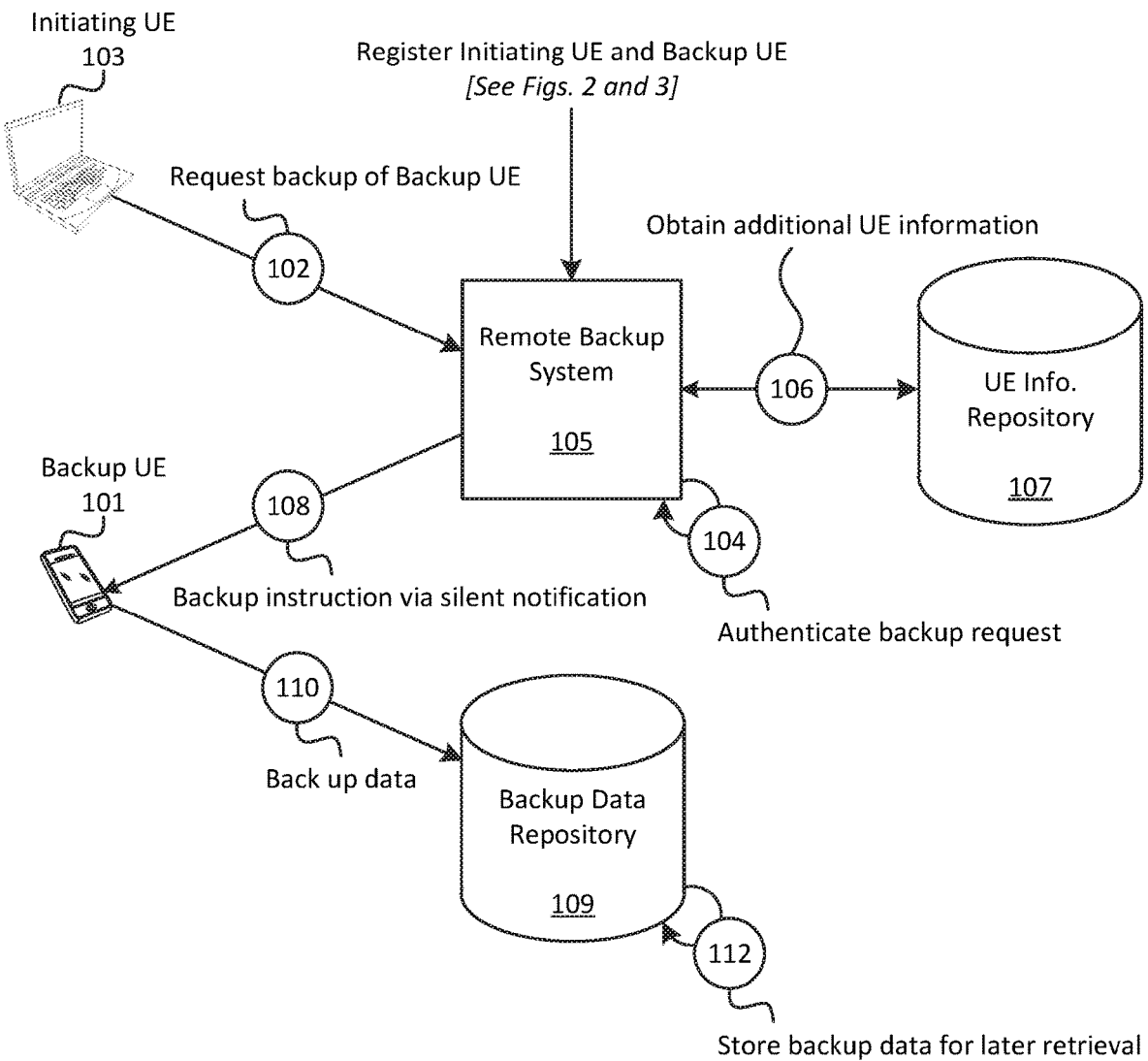
FIG. 1 illustrates an example overview of one or more embodiments described herein, in which a remote backup is initiated by a UE for another UE, in accordance with embodiments described herein.

As shown in FIG. 1, for example, Backup UE 101 and Initiating UE 103 may register with Remote Backup System 105. In the examples illustrated herein, Backup UE 101 may be a mobile telephone, and Initiating UE 103 may be a laptop computer. In practice, Backup UE 101 and/or Initiating UE 103 may both be mobile telephones, or may both be laptop computers. In some embodiments, Backup UE 101, Initiating UE 103, or both, may be or include some other type of device. Examples of registering Backup UE 101 and Initiating UE 103 are described below with respect to FIGS. 2 and 3, respectively. Briefly, this registration may be used to indicate or instantiate remote backup functionality for Backup UE 101, and may further be used to indicate that Initiating UE 103 is an authorized initiating UE for the remote backup of Backup UE 101.

As shown, Initiating UE 103 may request (at 102) a backup of Backup UE 101. For example, Remote Backup System 105 may be a web-accessible resource (e.g., accessible via the Internet), and Initiating UE 103 may execute an application that is configured to communicate with Remote Backup System 105. Additionally, or alternatively, Initiating UE 103 may communicate with Remote Backup System 105 via a web portal (e.g., using a Uniform Resource Locator ("URL") or other suitable identifier or locator associated with Remote Backup System 105). Additionally, or alternatively, Initiating UE 103 may communicate with Remote Backup System 105 via an application programming interface ("API") and/or some other suitable interface or communication pathway.

The backup request may include an identifier of Backup UE 101 (e.g., a Mobile Directory Number ("MDN"), an International Mobile Subscriber Identity ("IMSI") value, an International Mobile Station Equipment Identity ("IMEI") value, and/or some other suitable identifier). In some embodiments, the backup request may include authentication information associated with Initiating UE 103, such as a user name and password, an authentication token, etc. As described below, Initiating UE 103 may receive or maintain the identifier of Backup UE 101, the authentication token, and/or other information during a registration process with Remote Backup System 105.

In some embodiments, the backup request may include a selection of types of data (e.g., contact information, recent calls, photographs, videos, music, etc.) to backup. For example, as described below, Initiating UE 103 may present a GUI that provides options to select what types of data, associated with Backup UE 101, to backup. In some embodiments, a user associated with Backup UE 101 may indicate what types of data to backup. For example, prior to the request (at 102) from Initiating UE 103, such as during a registration process, Remote Backup System 105 may receive a pre-selection of types of data to backup, once a backup request is actually received (e.g., from Initiating UE 103).

In some embodiments, the backup request may include a network backup policy and/or other parameters regarding particular networks or network types via which the backup is permitted. For example, the network backup policy may specify that the backup may only occur when Backup UE 101 is connected to a Wi-Fi network, and/or to a particular Wi-Fi network (e.g., a Wi-Fi network having a specified Service Set Identifier ("SSID")). As another example, the network backup policy may specify that the backup may occur only when Backup UE 101 is not roaming (e.g., is connected to a "home" or "non-roaming" wireless network). As yet another example, the network backup policy may specify different parameters for different times of day, days of the week, etc. For example, the network backup policy may specify that the backup may only be performed when Backup UE 101 is connected to a Wi-Fi network between 9:00 AM and 5:00 PM, but may be performed regardless of network type between 5:01 PM and 8:59 AM.

In some embodiments, the network backup policy may specify different parameters for whether Backup UE 101 is in a "lost" mode. The network backup policy may specify, for example, that if Backup UE 101 is not in the "lost" mode, then Backup UE 101 may only backup while connected to Wi-Fi. The network policy may further specify that if Backup UE 101 is in the "lost" mode, then Backup UE 101 may backup while connected to any type of network.

In some embodiments, Backup UE 101 may be a device that supports a "lost" mode, in which Initiating UE 103 or some other authorized device may designate Backup UE 101 as being lost (e.g., out of the possession of an owner of Backup UE 101). In "lost" mode, Backup UE 101 may require user authentication (e.g., a Personal Identification Number ("PIN") code, user name and password, biometric authentication, and/or some other suitable authentication) before full functionality is restored. For example, if Backup UE 101 is a mobile telephone, the "lost" mode may restrict all functionality except for emergency calls. If Backup UE 101 is a laptop computer or some other device, the "lost" mode may restrict all functionality until full functionality is restored. In some embodiments, the "lost" mode may require additional authentication as compared to a standard "lock" screen or "login" screen associated with Backup UE 101. For example, the additional authentication may include answering security questions via a web portal, resetting a password associated with Backup UE 101, providing a two-factor authentication code from another authorized device, and/or other suitable additional authentication measures. In some embodiments, the "lost" mode may be initiated by Initiating UE 103 and/or some other device that is authorized to initiate the "lost" mode. Backup UE 101 may, for example, receive a command, notification, instruction, etc., from Remote Backup System 105 or some other device or system to enter the "lost" mode, and may thus enter the "lost" mode without user input at Backup UE 101.

In some embodiments, the network backup policy may specify a maximum throughput or amount of data to backup when connected to a particular type of network (e.g., a licensed wireless network, such as a Long-Term Evolution ("LTE") network, a Fifth Generation ("5G") network, a Third Generation ("3G") network, a Code Division Multiplex Access ("CDMA") network (e.g., a CDMA 2000 1x network), and/or some other licensed wireless network). In some embodiments, the network backup policy may include conditions based on a subscription associated with Backup UE 101. For example, the network backup policy may specify that if the size of the backup would exceed a data allotment associated with a subscription associated with Backup UE 101, then the backup may only be performed over a Wi-Fi network.

Figure 3:
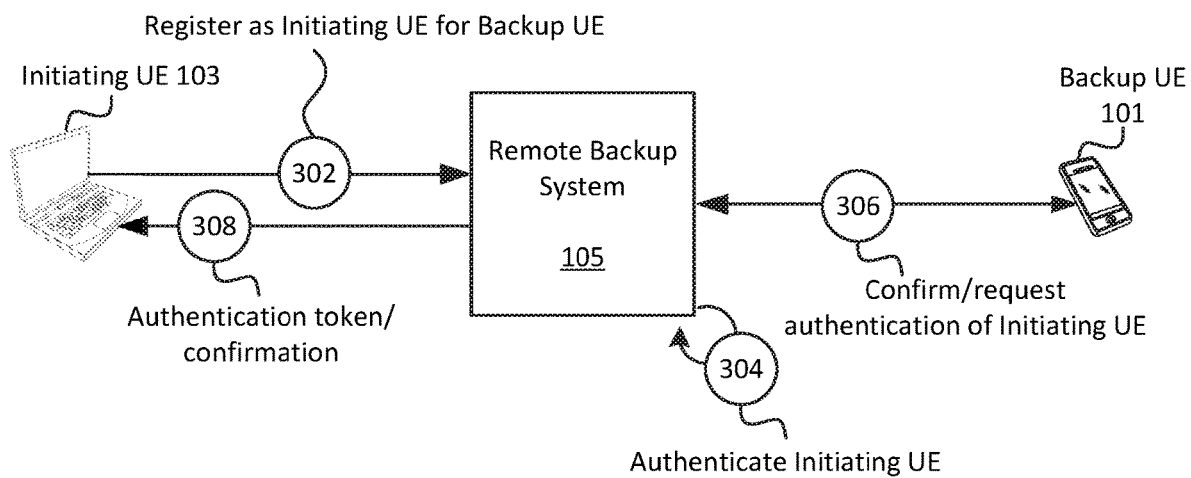
FIG. 3 illustrates an example registration of a UE as an Initiating UE, in accordance with some embodiments.

As further shown in FIG. 3, Remote Backup System 105 may authenticate (at 104) the backup request from Initiating UE 103. For example, Remote Backup System 105 may verify authentication credentials established or provided during registration. As discussed below, these authentication credentials may include a user name and password, an authentication token, and/or some other suitable set of authentication credentials.

In some embodiments, Remote Backup System 105 may obtain (at 106) additional information associated with Backup UE 101. For example, Remote Backup System 105 may obtain the additional information from UE Information Repository 107, which may be a device or system associated with a core of a wireless network (e.g., a LTE core network, a 5G core network, etc.). For example, UE Information Repository 107 may be, or may include, a Home Subscriber Server ("HSS"), a Unified Data Management function ("UDM"), or some other suitable device. In some embodiments, UE Information Repository 107 may be accessed via a Service Capability Exposure Function ("SCEF") associated with the core network, a Network Exposure Function ("NEF") associated with the core network, and/or some other suitable device or system. In some embodiments, UE Information Repository 107 may maintain information indicating an amount of data (e.g., in Megabytes, Gigabytes, etc.) remaining on a subscription associated with Backup UE 101, and/or other subscription-related information.

Remote Backup System 105 may further instruct (at 108) Backup UE 101 to perform a backup. For example, the instruction may include selected types of data to backup (e.g., as indicated in the backup request). In some embodiments, Backup UE 101 may have been pre-configured (e.g., during a registration process) of which types of data or particular items to back up. In some embodiments, the instruction (received at 106) may include the network backup policy, as discussed above. In some embodiments, the instruction may indicate the amount of data remaining on a subscription associated with Backup UE 101, and/or other suitable information.

In some embodiments, the instruction may include a URL, Internet Protocol ("IP") address, and/or other identifier or locator associated with Backup Data Repository 109. In some embodiments, Backup UE 101 may be pre-configured with the identifier or locator associated with Backup Data Repository 109. For example, an operating system or backup application executing on Backup UE 101 may be configured with the identifier or locator of Backup Data Repository 109.

In some embodiments, the instruction may be sent as a notification, such as a "silent" notification. For example, Backup UE 101 may implement (e.g., at the operating system level) a notification channel via which Backup UE 101 may receive instructions or messages that are not explicitly presented to a user of Backup UE 101. As one example, a notification related to a messaging application executing on Backup UE 101 may be considered a "non-silent" or "regular" notification. In some embodiments, the notification may include a token or some other suitable authentication mechanism, via which Backup UE 101 may authenticate the backup instruction.

In some embodiments, Backup UE 101 may have been configured (e.g., during a registration process) to present a "non-silent" or "regular" notification (e.g., a visual notification on a display screen) when the silent notification is received (at 108), indicating to a user of Backup UE 101 that a backup has been initiated. In some embodiments, this notification may include options to change what items or types of data are to be backed up, delay or reschedule the backup, cancel the backup, modify the network backup policy, and/or otherwise modify parameters of the backup.

Backup UE 101 may proceed to back up (at 110) the requested data. For example, Backup UE 101 may provide the requested data to Backup Data Repository 109 in accordance with the network backup policy. In some embodiments, Backup UE 101 may calculate the size of the backup prior to outputting the backup data, and may compare this calculated size to the remaining amount of data associated with the subscription of Backup UE 101 (e.g., if indicated in the network backup policy). As another example, Backup UE 101 may determine whether Backup UE 101 is in a "lost" mode, and may utilize one or more specific types of networks based on whether Backup UE 101 is in the "lost" mode and whether the network backup policy specifies different params for whether Backup UE 101 is in the "lost" mode.

Backup Data Repository 109 may receive and store (at 112) the backup data for later retrieval. While not described in detail herein, Backup Data Repository 109 may perform suitable authentication techniques prior to providing the backup data for later retrieval (e.g., restoring the backup on Backup UE 101 or another suitable device).

Figure 2:
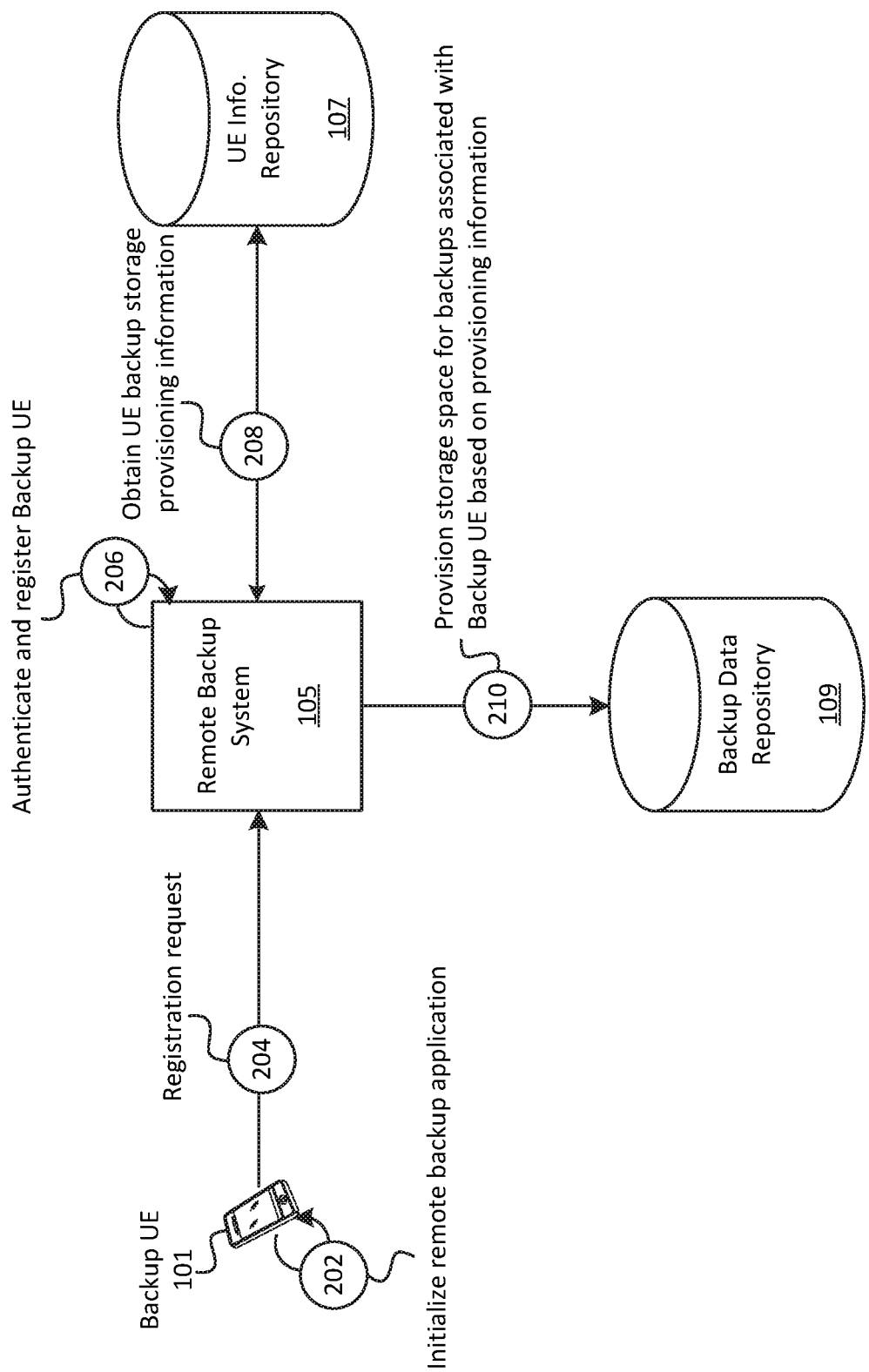
FIG. 2 illustrates an example registration of a UE as a Backup UE, in accordance with some embodiments.

As referred to above, FIG. 2 illustrates an example registration of Backup UE 101. As shown, Backup UE 101 may initialize (at 202) a remote backup application. In some embodiments, the remote backup application may be installed (e.g., "pre-loaded") on Backup UE 101 by a manufacturer or vendor (e.g., prior to receipt by a user of Backup UE 101). In some embodiments, the remote backup application may be part of the native functionality of an operating system or firmware of Backup UE 101. In some embodiments, the remote backup application may be installed by a user of Backup UE 101. For example, Backup UE 101 may install the remote backup application through an application "store." "Initializing" the remote backup application may include powering on or performing an initial setup process of UE 101 (e.g., where part of the initial setup includes initializing the remote backup application), and/or receiving a selection to open or execute the remote backup application.

Backup UE 101 may further output (at 204) a registration request to Remote Backup System 105. For example, the remote backup application may be configured with a URL, IP address, or other locator or identifier associated with Remote Backup System 105. The registration request may be sent after receiving a request (e.g., from a user of Backup UE 101, via the remote backup application) to register for the remote backup techniques described herein. In some embodiments, the registration request may include a device identifier associated with Backup UE 101, such as an IMSI, IMEI, MDN, etc. In some embodiments, the device identifier may be derived from a device identifier, such as a hash or other operation performed on the IMSI, IMEI, MDN, and/or other suitable value.

In some embodiments, the registration request may include one or more network backup policies. For example, in some embodiments, the network backup policies specified during registration (at 204) may override a network backup policy specified during a backup request (e.g., at 102). For example, the registration request may specify that when Backup UE 101 is in "lost" mode, the backup may occur via any network or type of network. Thus, even if a backup request does not indicate that a particular type of network is permissible (e.g., a LTE network) for the backup, Backup UE 101 may nonetheless perform the backup via the particular type of network if Backup UE 101 is in "lost" mode.

Remote Backup System 105 may authenticate and register (at 206) Backup UE 101 based on receiving the registration request. For example, Remote Backup System 105 may authenticate Backup UE 101 based on the received device identifier. In some embodiments, Remote Backup System 105 may communicate with an authentication system and/or with UE Information Repository 107 (e.g., an HSS, UDM, etc. of a core network and/or some other suitable device or system) in order to authenticate Backup UE 101.

As further shown, Remote Backup System 105 may communicate with UE Information Repository 107 to obtain (at 208) information indicating an amount of storage resources allocated for backups associated with Backup UE 101. For example, UE Information Repository 107 may maintain information indicating the amount of storage resources (e.g., associated with Backup Data Repository 109) that has been provisioned, or is authorized to be provisioned, for Backup UE 101. In some embodiments, different UEs may be associated with different subscriptions or policies that indicate different amounts of storage that may be used for backups. In some embodiments, the amount may change based on the actual capacity and/or utilization of Backup Data Repository 109. For example, if Backup Data Repository 109 is relatively heavily utilized, less storage resources may be available for Backup UE 101 than if Backup Data Repository 109 is less heavily utilized. In some embodiments, Remote Backup System 105 may provision (at 210), or cause to be provisioned, the amount of storage resources, of Backup Data Repository 109, for Backup UE 101.

As also referred to above, FIG. 3 illustrates an example registration of Initiating UE 103. As shown, Initiating UE 103 may register (at 302) as an initiating UE for Backup UE 101. For example, Initiating UE 103 may provide an identifier of Backup UE 101, such as an MDN and/or some other suitable identifier, along with a request to register as an initiating UE for Backup UE 101. Remote Backup System 105 may authenticate (at 304) Initiating UE 103. For example, Remote Backup System 105 may determine whether Initiating UE 103 is associated with a same account as Backup UE 101. As another example, Remote Backup System 105 may confirm and/or request (at 306) the authentication of Initiating UE 103. For example, Remote Backup System 105 may output a notification or other suitable prompt to Backup UE 101, such as "Did you just register a new initiating device?" Once authenticated (at 304 and/or 306), Remote Backup System 105 may output (at 308) a confirmation and/or a token to Initiating UE 103. As noted above, this token may be provided by Initiating UE 103 during subsequent requests (e.g., at 102) to back up Backup UE 101.

FIG. 4 illustrates an example GUI 401, which may be displayed to select types of data to backup and/or a network backup policy. GUI 401 may, for example, be presented via Initiating UE 103 (e.g., as part of the request to initiate a backup) and/or via Backup UE 101 (e.g., as a preference selection for future backups). As shown in FIG. 4, different types of data, such as contacts, photos, videos, music, documents, messages, and/or call history, may be selectable.

Further, GUI 401 may provide various options to specify a network backup policy. In the example shown, these options may include a Wi-Fi Only option, a Wi-Fi Only (Specific networks) option (e.g., where a user may further specify particular Wi-Fi networks), or a Wi-Fi and Mobile Networks option. As further shown here, an "Unrestricted backups in Lost mode" option may be provided, which may specify special behavior when Backup UE 101 is in "lost"

mode. In some embodiments, these options may be presented in a different manner, and/or other options may be presented via GUI 401.

Figure 5:
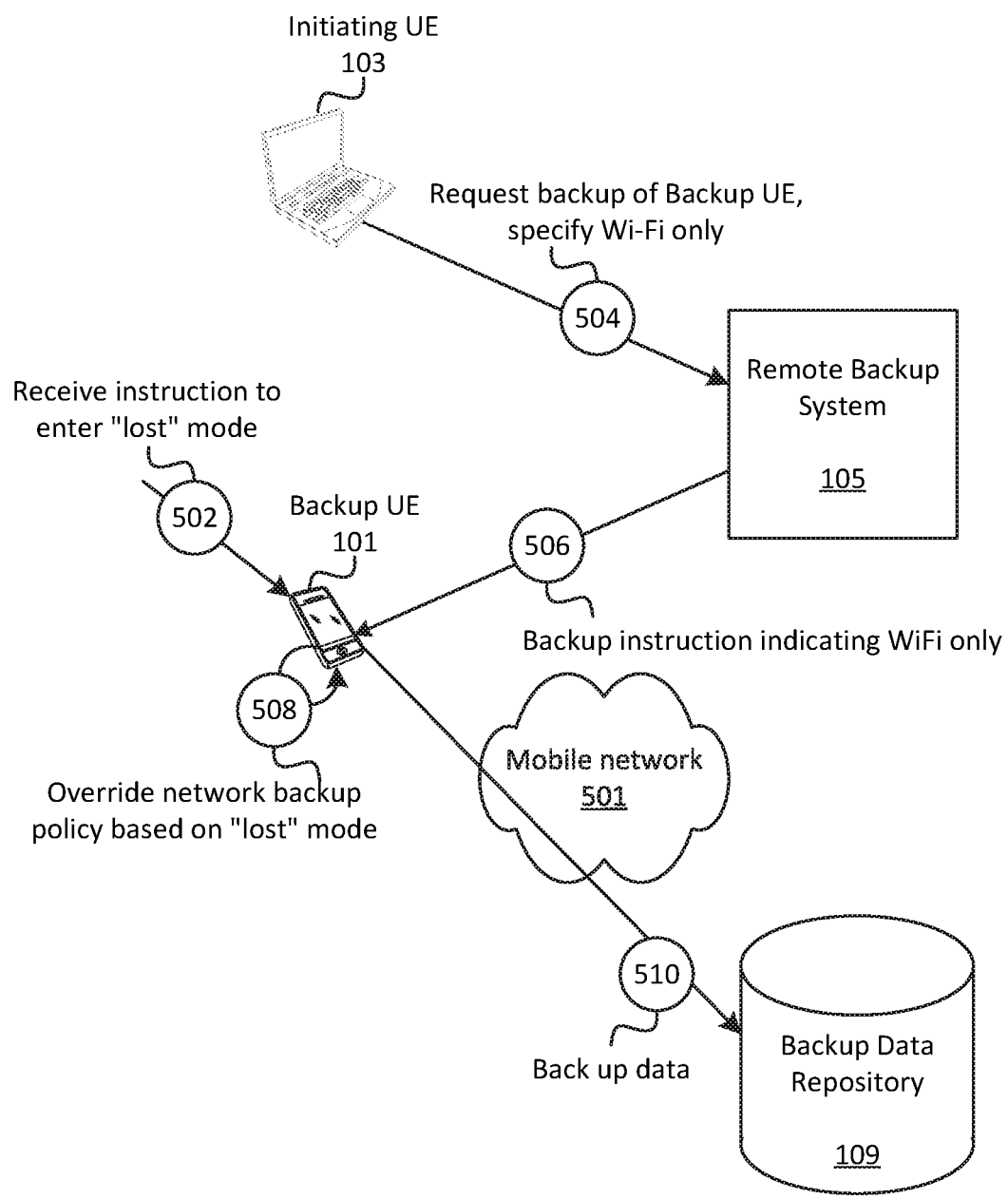
FIG. 5 illustrates an example embodiment, in which a network backup policy, specified by an Initiating UE, may be overridden when a Backup UE is in "lost" mode.
Figure 6:
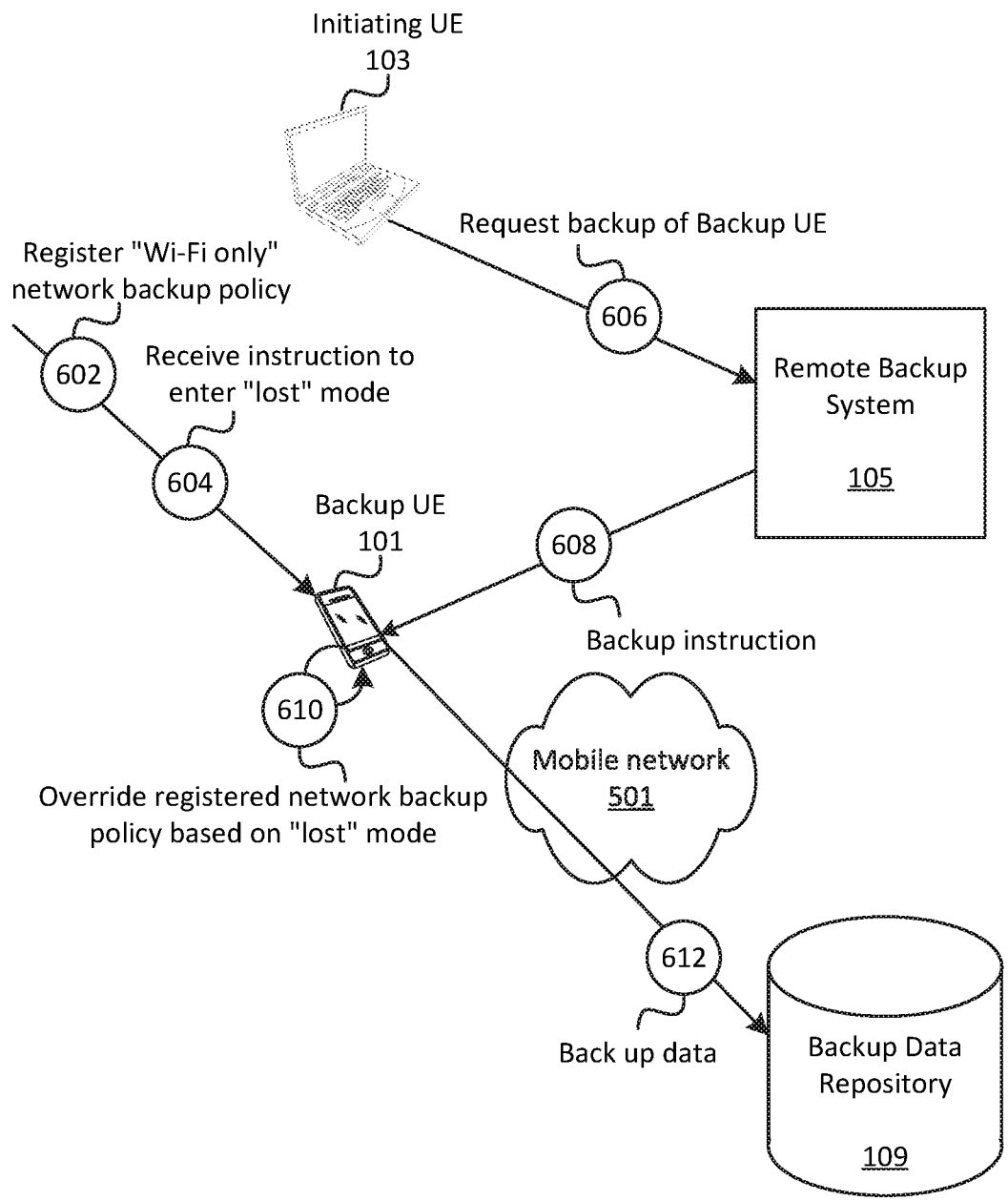
FIG. 6 illustrates an example embodiment, in which a network backup policy, specified by a Backup UE may be overridden when the Backup UE is in "lost" mode.

FIGS. 5 and 6 illustrate example embodiments, in which a network backup policy may be overridden when Backup UE 101 is in "lost" mode. For example, FIG. 5 illustrates an example in which a network backup policy, specified by Initiating UE 103, may be overridden when Backup UE 101 is in "lost" mode, and FIG. 6 illustrates an example in which a network backup policy, specified by Backup UE 101 (e.g., during registration) may be overridden when Backup UE 101 is in "lost" mode. Some of the operations shown in these figures may be the same as, or similar to, operations described above. Therefore, these operations are not discussed in detail below for the sake of brevity. Further, some of the operations described above (e.g., authentication, provisioning, etc.) are not shown in these figures for the sake of brevity. In practice, some or all of these operations may be performed in conjunction with the operations shown in FIGS. 5 and 6.

As shown in FIG. 5, for example, Backup UE 101 may receive (at 502) an instruction to enter "lost" mode. For example, Backup UE 101 may receive the instruction from Initiating UE 103, Remote Backup System 105, and/or some other authorized device or system. For example, Backup UE 101 may implement an API or other suitable mechanism whereby Backup UE 101 may receive and authenticate the instruction, and may accordingly enter the "lost" mode. As discussed above, the "lost" mode may include limited functionality at Backup UE 101, such as the inability to access applications, make non-emergency telephone calls, etc. before performing an enhanced unlock process, which may include authentication procedures beyond a normal unlock process. For example, the enhanced unlock process may involve an authentication server, and may include verification that Backup UE 101 is back in the possession of a rightful owner of Backup UE 101.

At some point after Backup UE 101 enters the "lost" mode, Initiating UE 103 may request (at 504) a backup of Backup UE 101. In this example, the request may specify a network backup policy, which may indicate that the backup may only be performed via a Wi-Fi network. For example, a user associated with Initiating UE 103 may not be aware that Backup UE 101 is in "lost" mode, the request may be an automated request, the request may inadvertently include the network backup policy, etc.

Remote Backup System 105 may output (at 506) the backup instruction, including the "Wi-Fi only" network backup policy. As discussed above, the backup instruction may be sent via a "silent" notification and/or some other suitable messaging technique.

Backup UE 101 may receive the instruction, including the "Wi-Fi only" network backup policy, and may override (at 508) the indicated network backup policy based on being in "lost" mode. For example, as discussed above, Backup UE 101 may execute a backup application, and/or an operating system associated with Backup UE 101 may be configured with backup functionality, via which Backup UE 101 may receive the backup instruction and back up data accordingly. In some embodiments, the backup application and/or the operating system of Backup UE 101 may communicate via an API, via which the operating system of Backup UE 101 may indicate to the backup application that Backup UE 101 is in "lost" mode. In some embodiments, Backup UE 101 may override the indicated network backup policy based on a selection of an option (e.g., the "Unrestricted backups in Lost mode" option shown in FIG. 4) to override a network backup policy, indicated in a backup request, when Backup UE 101 is in "lost" mode.

Based on overriding the "Wi-Fi only" network backup policy, Backup UE 101 may back up (at 510) device data over Mobile Network 501 (e.g., a type of network other than a Wi-Fi network). "Mobile" Network 501 may refer to, for example, a LTE network, a 5G network, and/or some other type of network that utilizes licensed communications. Mobile Network 501 may include, in some embodiments, a cellular wireless telecommunications network.

In some embodiments, when in "lost" mode, Backup UE 101 may initiate a backup without receiving a notification from Remote Backup System 105. For example, either immediately upon entering into "lost" mode, or after a threshold amount of time, Backup UE 101 may initiate the backup. In some embodiments, Backup UE 101 may ignore a configured network backup policy when performing the backup when in "lost" mode (e.g., may back up data via Mobile Network 501, even if Backup UE 101 has been configured with a "Wi-Fi only" network backup policy).

As shown in FIG. 6, Backup UE 101 may register (at 602) and/or otherwise be configured with a "Wi-Fi only" network backup policy. In some embodiments, this registration may include the omission of a selection of an option to override network backup policies while in "lost" mode. For example, the "Unrestricted backups in Lost mode" option shown in FIG. 4 may not be selected at Backup UE 101 during a registration or configuration process.

At some subsequent time, Backup UE 101 may receive (at 604) an instruction to enter "lost" mode, and may accordingly enter "lost" mode. Initiating UE 103 may subsequently output (at 606) a request for a backup of Backup UE 101, and Remote Backup System 105 may output (at 608) a backup instruction to Backup UE 101. Operations performed in this example may be independent of a network backup policy indicated in the request, and/or the request may not indicate a network backup policy.

Backup UE 101 may receive the request and, based on being in "lost" mode, may override (at 610) the configured "Wi-Fi only" network backup policy. This overriding may be useful in scenarios where Backup UE 101 is permanently lost. In some embodiments, Backup UE 101 may override the configured network backup policy only after having been in "lost" mode for a threshold period of time. For example, if Backup UE 101 has been in "lost" mode for at least 24 hours, Backup UE 101 may override (at 610) the configured network backup policy, whereas if Backup UE 101 has been in "lost" mode for less than 24 hours, Backup UE 101 may adhere to the registered network backup policy. Under this approach, deference may be given to the configured network backup policy, but if Backup UE 101 is permanently lost, the data stored on Backup UE 101 may be effectively backed up (at 612) via Mobile Network 501 for later retrieval and restoration on a new UE.

In some embodiments, if Backup UE 101 is in "lost" mode, Backup UE 101 may notify Remote Backup System 105 that Backup UE 101 is in "lost" mode. Remote Backup System 105 may communicate with a charging system associated with Mobile Network 501, to indicate that Backup UE 101 is in "lost" mode and is backing up data via Mobile Network 501. Based on this communication, the charging system associated with Mobile Network 501 may reduce or eliminate data charges associated with the backup. In some embodiments, Remote Backup System 105 may provision additional storage space in Backup Data Repository 109, and/or may instruct Backup Data Repository 109 to permit the backup from Backup UE 101 to exceed an initially provisioned amount of storage space based on being in "lost" mode. In this manner, robust solutions may be provided for users who have lost their devices and have not necessarily prepared for such an occurrence.

While examples of how a "lost" mode may be overridden are provided above, in practice, other variations are possible. For example, when entering "lost" mode, Backup UE 101 may notify Remote Backup System 105 that Backup UE 101 is in "lost" mode. For example, the backup application executing on Backup UE 101 may receive, from an operating system of Backup UE 101, an indication that Backup UE 101 has been placed in "lost" mode, and may communicate with Remote Backup System 105 to indicate that Backup UE 101 is in "lost" mode. In such a scenario, Remote Backup System 105 may override a network backup policy indicated by Initiating UE 103 (e.g., in a backup request), and may provide a different network backup policy (e.g., an unrestricted network backup policy) to Backup UE 101 when providing a backup instruction to Backup UE 101.

Figure 7:
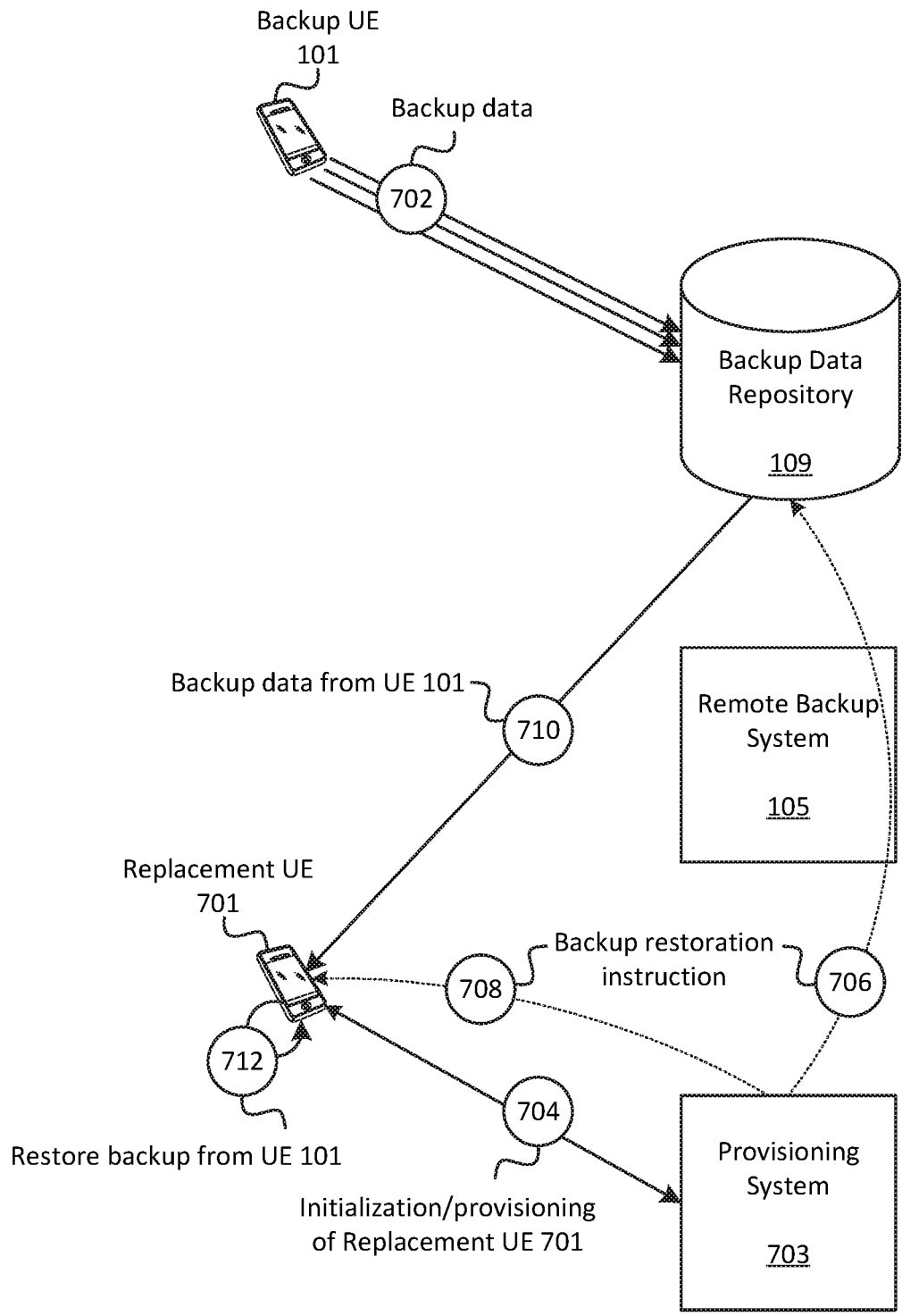
FIG. 7 illustrates an example embodiment, in which a remote backup associated with a Backup UE is automatically restored to a Replacement UE when the Backup UE has been lost, damaged, upgraded, and/or otherwise replaced.

FIG. 7 illustrates an example embodiment, in which backup data, associated with Backup UE 101, is automatically restored to a Replacement UE 701 when Backup UE 101 has been lost, damaged, upgraded, and/or otherwise replaced. For example, as shown, Backup Data Repository 109 may receive (at 702) backup data from UE 101. The backup data may be received based on requests from an authorized Initiating UE 103, may be received automatically (e.g., as part of a periodic or intermittent backup procedure), and/or may be received in some other fashion.

At some point, Backup UE 101 may be replaced by Replacement UE 701. For example, Backup UE 101 may be lost, damaged, or otherwise unusable. As another example, a user associated with Backup UE 101 may opt to upgrade devices, or select a different device. As such, Replacement UE 701 may be initialized and/or provisioned (at 704) with Provisioning System 703, which may be an element of a wireless telecommunications network and/or may be communicatively coupled to a wireless telecommunications network (e.g., with which Backup UE 101 is also associated). For example, Provisioning System 703 may be, may include, or may be communicatively coupled with, a HSS, UDM, and/or other device or system that maintains subscription information associated with UEs and/or subscribers.

The initializing and/or provisioning may include indicating, to Provisioning System 703, that Replacement UE 701 is a replacement for Backup UE 101. For example, the initializing or provisioning may include providing an account or user identifier, indicating that Backup UE 101 and Replacement UE 701 are both associated with the same account or user. In some embodiments, Initiating UE 103 may provide (not shown) an indication to Provisioning System 703 and/or Remote Backup System 105, that Replacement UE 701 is a replacement for Backup UE 101. While not described in detail here, Provisioning System 703 and/or Remote Backup System 105 may authenticate Replacement UE 701 to verify that Replacement UE 701 is authorized to receive backup data associated with Backup UE 101.

Based on the initialization and/or provisioning, Provisioning System 703 may instruct Remote Backup System 105 and/or Backup Data Repository 109 to provide (at 710) backup data, from UE 101, to Replacement UE 701. For example, Provisioning System 703 may instruct Remote Backup System 105 to provide the backup data, which may in turn instruct Backup Data Repository 109 to provide the backup data, and/or may retrieve the backup data from Backup Data Repository 109 and provide the backup data to Replacement UE 701 (not shown). Additionally, or alternatively, Provisioning System 703 may instruct Backup Data Repository 109 to provide the backup data to Replacement UE 701.

Additionally, or alternatively, Provisioning System 703 may instruct (at 708) Replacement UE 701 to obtain backup information, associated with Backup UE 101. Based on this instruction, Replacement UE 701 may obtain (at 710) the backup data from Backup Data Repository 109. In some embodiments, Provisioning System 703 may provide authentication information (e.g., an authentication token, an authentication key, etc.) to Replacement UE 701, Remote Backup System 105, and/or Backup Data Repository 109, which may be used to authenticate a request from Replacement UE 701 for the backup data associated with Backup UE 101.

Once the backup data is received (at 710) from UE 101, Replacement UE 701 may restore (at 712) the backup data by installing, storing, etc. some or all of the received backup data. In this manner, Replacement UE 701 may have settings configured, may have user data (e.g., pictures, videos, music, documents, etc.) stored on local storage, may have user accounts already configured, and/or may otherwise be configured to provide the same or similar user experience as Backup UE 101. Further, this configuration may occur at the time of initial provisioning (e.g., by a vendor, carrier, etc.) prior to receipt by the user, thereby minimizing the amount of user interaction needed for data from Backup UE 101 to be restored, installed, configured, etc. on Replacement UE 701.

Figure 8:
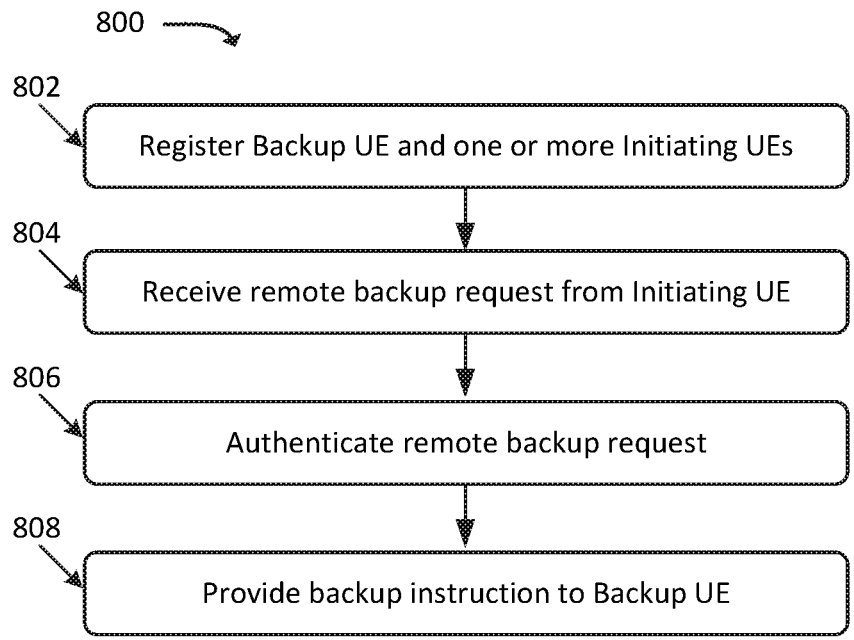
FIG. 8 illustrates an example process for backing up a UE, in accordance with embodiments described herein.

FIG. 8 illustrates an example process 800 for initiating a remote backup. In some embodiments, some or all of process 800 may be performed by Remote Backup System 105. In some embodiments, one or more other devices may perform some or all of process 800 (e.g., in concert with, and/or in lieu of, Remote Backup System 105).

As shown, process 800 may include registering (at 802) Backup UE 101 and one or more Initiating UEs 103. For example, as described above, Remote Backup System 105 may receive identifying information associated with Backup UE 101 and Initiating UE 103, and may authenticate Initiating UE 103 as being authorized to initiate remote backups for Backup UE 101.

Process 800 may further include receiving (at 804) a remote backup request from Backup UE 101. As described above, the remote backup request may include identifying information for Backup UE 101, a network backup policy, types of data to back up, etc. In some embodiments, the remote backup request may include authentication information, such as a token received by Initiating UE 103 during the registration process (at 802).

Process 800 may further include authenticating (at 806) the remote backup request. For example, the remote backup request may include a token and/or other suitable authentication information, based on which Remote Backup System 105 may verify that Initiating UE 103 is authorized to request a remote backup of Backup UE 101.

Process 800 may also include providing (at 808) a backup instruction to Backup UE 101. Based on this backup instruction, Backup UE 101 may initiate a backup according to the indicated network policy. In some embodiments, as discussed above, Backup UE 101 may override the network backup policy based on being in "lost" mode.

Figure 9:
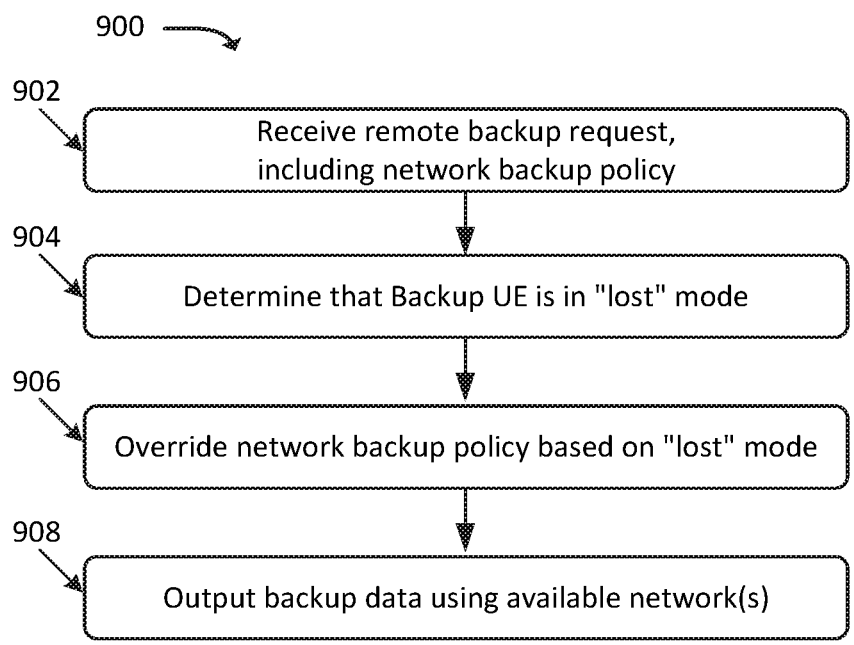
FIG. 9 illustrates an example process for overriding a network backup policy when a Backup UE is in "lost" mode.

FIG. 9 illustrates an example process 900 for performing a device backup when Backup UE 101 is in "lost" mode. In some embodiments, some or all of process 900 may be performed by Backup UE 101. In some embodiments, one or more other devices may perform some or all of process 900 (e.g., in concert with, and/or in lieu of, Backup UE 101).

As shown, process 900 may include receiving (at 902) a remote backup request. The remote backup request may include a network backup policy (e.g., as specified by Initiating UE 103).

Process 900 may further include determining (at 904) that Backup UE 101 is in "lost" mode. For example, Backup UE 101 may have been placed in "lost" mode prior to receiving (at 902) the remote backup request.

Process 900 may additionally include overriding (at 906) a configured network backup policy based on the determination that Backup UE 101 is in the "lost" mode. For example, as discussed above, based on Backup UE 101 in "lost" mode, the requested data associated with Backup UE 101 may need to be backed up, regardless of the network backup policy specified by Initiating UE 103. In some embodiments, Backup UE 101 and/or Remote Backup System 105 may notify Initiating UE 103 that Backup UE 101 is in "lost" mode, and may request permission to override the network backup policy specified in the remote backup request. In such embodiments, Backup UE 101 may override the specified network backup policy upon receipt of confirmation from Initiating UE 103 that the network backup policy may be overridden.

Process 900 may also include outputting (at 908) the backup data, associated with Backup UE 101, using any available network. For example, even if the network backup policy restricts a given type of network (e.g., Mobile Network 501), the restricted network may be used when the network backup policy is overridden.

Figure 10:
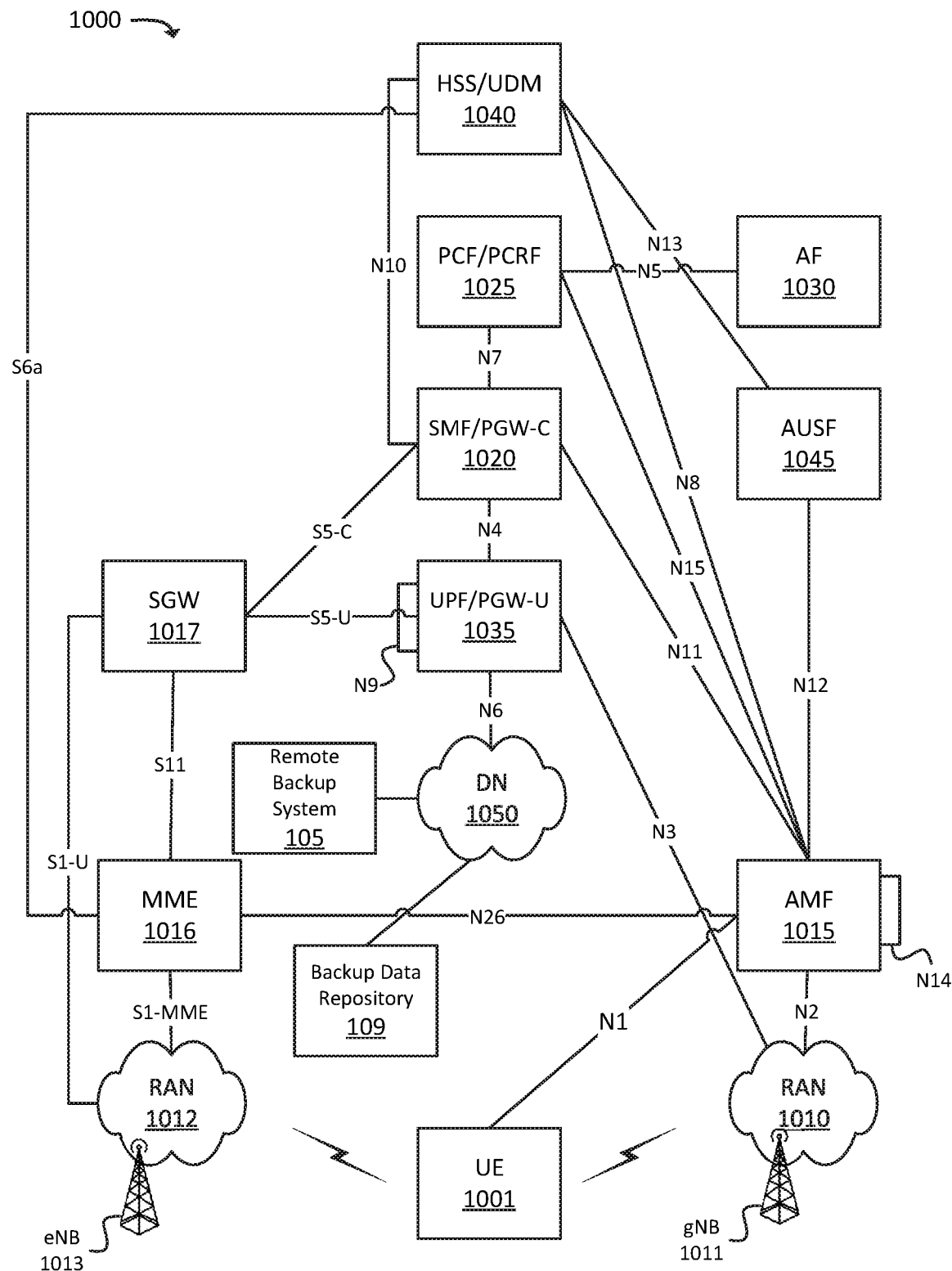
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a 5G network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 1000 may include UE 1001, radio access network ("RAN") 1010 (which may include one or more Next Generation Node Bs ("gNBs") 1011), RAN 1012 (which may include one or more one or more evolved Node Bs ("eNBs") 1013), Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, HSS/UDM 1040, Authentication Server Function ("AUSF") 1045, Data Network ("DN") 1050, Remote Backup System 105, and Backup Data Repository 109.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1001 may include a computation and communication device, such as a wireless mobile communication device that is capable of communicating with RAN 1010 and/or DN 1050. UE 1001 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, or another type of mobile computation and communication device. UE 1001 may send traffic to and/or receive traffic (e.g., user plane traffic) from DN 1050 via RAN 1010 and UPF/PGW-U 1035. Backup UE 101, Initiating UE 103, and/or Replacement UE 701 may be instances of UE 1001.

RAN 1010 may be, or may include, a 5G RAN that includes one or more base stations (e.g., one or more gNBs 1011), via which UE 1001 may communicate with one or more other elements of environment 1000. UE 1001 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, AMF 1015, and/or one or more other devices or networks) and may communicate the traffic to UE 1001 via the air interface.

RAN 1012 may be, or may include, an LTE RAN that includes one or more base stations (e.g., one or more eNBs 1013), via which UE 1001 may communicate with one or more other elements of environment 1000. UE 1001 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, SGW 1017, and/or one or more other devices or networks) and may communicate the traffic to UE 1001 via the air interface.

AMF 1015 may include one or more devices, systems, Virtualized Network Functions ("VNFs"), etc., that perform operations to register UE 1001 with the 5G network, to establish bearer channels associated with a session with UE 1001, to hand off UE 1001 from the 5G network to another network, to hand off UE 1001 from the other network to the 5G network, manage mobility of UE 1001 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015). MME 1016 may include one or more devices, systems, VNFs, etc., that perform operations to register UE 1001 with the EPC, to establish bearer channels associated with a session with UE 1001, to hand off UE 1001 from the EPC to another network, to hand off UE 1001 from another network to the EPC, manage mobility of UE 1001 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012). SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1001. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1001, from DN 1050, and may forward the user plane data toward UE 1001 (e.g., via RAN 1010, SMF/PGW-C 1020, and/or one or more other devices). In some embodiments, multiple UPFs 1035 may be deployed (e.g., in different geographical locations), and the delivery of content to UE 1001 may be coordinated via the N9 interface (e.g., as denoted in FIG. 10 by the line marked "N9" originating and terminating at UPF/PGW-U 1035). Similarly, UPF/PGW-U 1035 may receive traffic from UE 1001 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1001. In some embodiments, Provisioning System 703 may be communicatively coupled with, may be implemented by, and/or may include HSS/UDM 1040 and/or AUSF 1045.

DN 1050 may include one or more wired and/or wireless networks. For example, DN 1050 may include an IP-based PDN, a wide area network ("WAN") such as the Internet, a private enterprise network, and/or one or more other networks. UE 1001 may communicate, through DN 1050, with data servers, other UEs 1001, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1001 may communicate.

Remote Backup System 105 may include one or more devices, systems, VNFs, etc., that manage the enhanced remote backup techniques described herein. For example, Remote Backup System 105 may register Backup UE 101 and Initiating UE 103, and may authenticate and forward remote backup requests from Initiating UE 103. Backup Data Repository 109 may include one or more devices, systems, VNFs, etc., that receive and store backup data from Backup UE 101, and provide the backed up data for later retrieval to authorized devices or systems.

Figure 11:
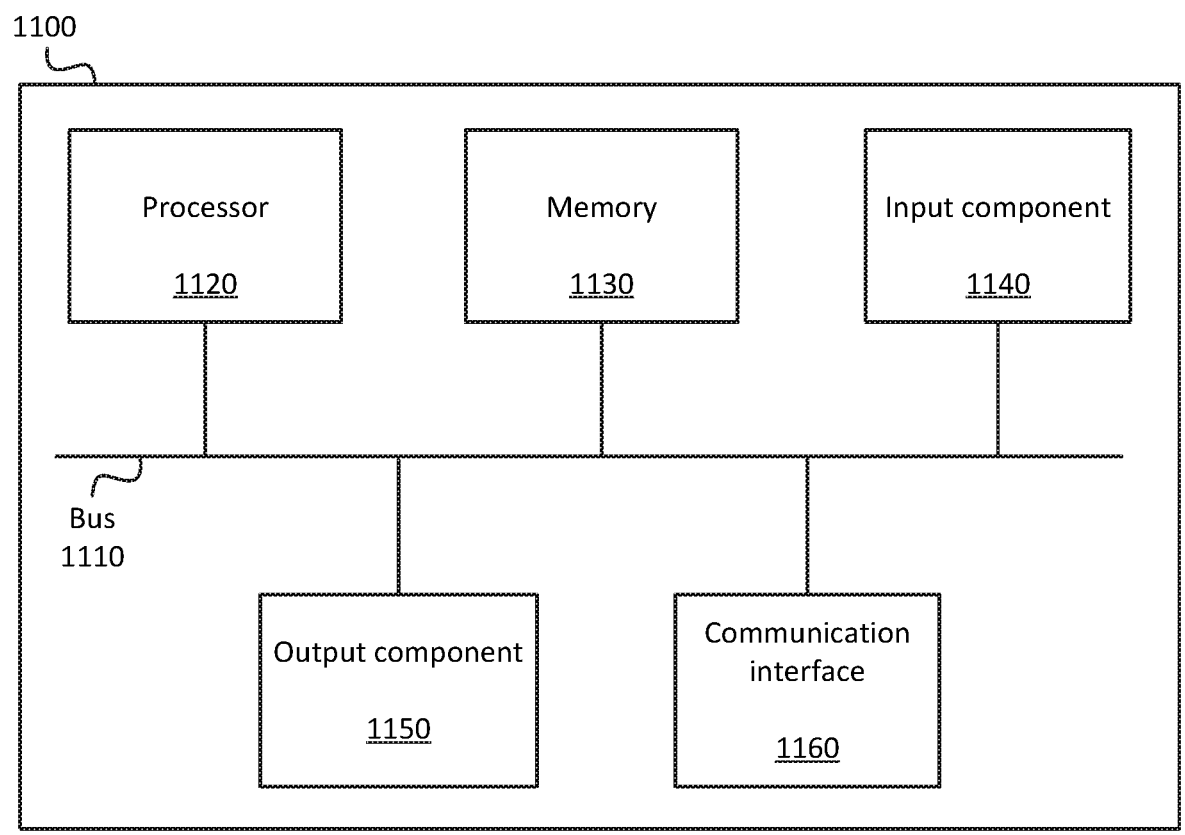
FIG. 11 illustrates example functional components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while discussed in the context of a "lost" mode, in some embodiments, similar concepts may apply for UEs that have some other type of status that is associated with inaccessibility by a user associated with respective UEs. For example, a UE may be set to "damaged" mode (e.g., by receiving an instruction or notification, similar to the enabling of "lost" mode discussed above). For example, a user may set the UE to "damaged" mode if a screen, input device, or other component of the UE is damaged or unusable. In some embodiments, the UE may automatically set itself to "damaged" mode if one or more sensors of the UE indicate that the UE is, or may be, damaged. For example, if an accelerometer or other motion detection component of the UE detects that the UE has been dropped, has experienced an impact of at least a threshold amount of force, etc., the UE may set itself to "damaged" mode. As another example, if a moisture sensor of the UE detects that the UE has been exposed to a threshold amount of moisture, the UE may set itself to "damaged" mode. As another example, some other suitable sensor or mechanism may indicate that a screen of the UE has been cracked or otherwise damaged, based on which the UE may set itself to "damaged" mode. When in the "damaged" mode, a remote backup may be initiated by an initiating device, and/or the UE may automatically initiate a backup, such that data stored on the UE may be recovered at a later time.

While series of blocks and/or signals have been described above (e.g., with regard to FIGS. 1-3, and 5-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
register a first User Equipment ("UE") for a remote backup service, the registering including receiving an identifier associated with the first UE;
register a second UE as an authorized initiating device for the remote backup service associated with the first UE, wherein registering the second UE includes:
receiving authorization for the second UE from the first UE, and
providing, based on receiving the authorization from the first UE, an authentication token to the second UE;
receive, from the second UE, a remote backup request, the remote backup request including:
the authentication token,
the identifier of the first UE, and
an indication of a first network backup policy that identifies at least one of:

a first type of network over which the requested remote backup is permitted, or a second type of network over which the requested remote backup is not permitted;

authenticate, based on the remote backup request, the second UE based on the identifier of the first UE and the authentication token; and output, to the first UE, based on authenticating the second UE, an instruction to back up data stored by the first UE in accordance with the first network backup policy, wherein the first UE is in a "lost" mode when receiving the instruction to back up the data stored by the first UE, wherein the first UE overrides the first network backup policy with a second network backup policy that indicates that the requested remote backup is permitted via the second type of network, wherein the UE further outputs backup data, in response to the instruction to back up the data, via the second type of network.

2. The device of claim 1, wherein the licensed wireless network includes at least one of:
a Code Division Multiplex Access ("CDMA") network,
a Third Generation ("3G") network,
a Long-Term Evolution ("LTE") network, or
a Fifth Generation ("5G") network.

3. The device of claim 2, wherein the unlicensed network includes a Wi-Fi network.

4. The device of claim 1, wherein outputting the instruction includes outputting a silent notification to the first UE via a silent notification service implemented by an operating system of the first UE.

5. The device of claim 1, wherein the first UE is in the "lost" mode based on an instruction from the second UE prior to the instruction to back up the data stored by the first UE.

6. The device of claim 1, wherein the first UE enters the "lost" mode without receiving user input at the first UE to enter the "lost" mode.

7. The device of claim 1, wherein the remote backup request from the second UE does not specify the second network backup policy.

8. The non-transitory computer-readable medium of claim 1, wherein the first UE enters the "lost" mode without receiving user input at the first UE to enter the "lost" mode.

9. A non-transitory computer-readable medium, storing a plurality of processor-executable instructions to:
register a first User Equipment ("UE") for a remote backup service, the registering including receiving an identifier associated with the first UE;
register a second UE as an authorized initiating device for the remote backup service associated with the first UE, wherein registering the second UE includes:
receiving authorization for the second UE from the first UE, and
providing, based on receiving the authorization from the first UE, an authentication token to the second UE;
receive, from the second UE, a remote backup request, the remote backup request including:
the authentication token,
the identifier of the first UE, and
an indication of a first network backup policy that identifies at least one of:
a first type of network over which the requested remote backup is permitted, or
a second type of network over which the requested remote backup is not permitted;

authenticate, based on the remote backup request, the second UE based on the identifier of the first UE and the authentication token; and output, to the first UE, based on authenticating the second UE, an instruction to back up data stored by the first UE in accordance with the first network backup policy, wherein the first UE is in a "lost" mode when receiving the instruction to back up the data stored by the first UE, wherein the first UE overrides the first network backup policy with a second network backup policy that indicates that the requested remote backup is permitted via the second type of network, wherein the UE further outputs backup data, in response to the instruction to back up the data, via the second type of network.

10. The non-transitory computer-readable medium of claim 9, wherein the licensed wireless network includes at least one of:
a Code Division Multiplex Access ("CDMA") network,
a Third Generation ("3G") network,
a Long-Term Evolution ("LTE") network, or
a Fifth Generation ("5G") network.

11. The non-transitory computer-readable medium of claim 9, wherein outputting the instruction includes outputting a silent notification to the first UE via a silent notification service implemented by an operating system of the first UE.

12. The non-transitory computer-readable medium of claim 9, wherein the first UE is in the "lost" mode based on an instruction from the second UE prior to the instruction to back up the data stored by the first UE.

13. The non-transitory computer-readable medium of claim 9, wherein the remote backup request from the second UE does not specify the second network backup policy.

14. A method, comprising:
registering a first User Equipment ("UE") for a remote backup service, the registering including receiving an identifier associated with the first UE;
registering a second UE as an authorized initiating device for the remote backup service associated with the first UE, wherein registering the second UE includes:
receiving authorization for the second UE from the first UE, and
providing, based on receiving the authorization from the first UE, an authentication token to the second UE;
receiving, from the second UE, a remote backup request, the remote backup request including:
the authentication token,
the identifier of the first UE, and
an indication of a first network backup policy that identifies at least one of:
a first type of network over which the requested remote backup is permitted, or
a second type of network over which the requested remote backup is not permitted;
authenticating, based on the remote backup request, the second UE based on the identifier of the first UE and the authentication token; and
outputting, to the first UE, based on authenticating the second UE, an instruction to back up data stored by the first UE in accordance with the first network backup policy,
wherein the first UE is in a "lost" mode when receiving the instruction to back up the data stored by the first UE, wherein the first UE overrides the first network backup policy with a second network backup policy that indicates that the requested remote backup is permitted via the second type of network, wherein the UE further outputs backup data, in response to the instruction to back up the data, via the second type of network.

15. The method of claim 14, wherein the licensed wireless network includes at least one of: a Code Division Multiplex Access ("CDMA") network, a Third Generation ("3G") network, a Long-Term Evolution ("LTE") network, or a Fifth Generation ("5G") network.

16. The method of claim 14, wherein outputting the instruction includes outputting a silent notification to the first UE via a silent notification service implemented by an operating system of the first UE.

17. The method of claim 14, wherein the unlicensed network includes a Wi-Fi network.

18. The method of claim 14, wherein the first UE is in the "lost" mode based on an instruction from the second UE prior to the instruction to back up the data stored by the first UE.

19. The method of claim 14, wherein the first UE enters the "lost" mode without receiving user input at the first UE to enter the "lost" mode.

20. The method of claim 14, wherein the remote backup request from the second UE does not specify the second network backup policy.

* * * * *